United States Patent
Achatz et al.

(10) Patent No.: US 10,167,185 B2
(45) Date of Patent: Jan. 1, 2019

(54) FILLING ADAPTER HAVING A COAXIAL VALVE

(71) Applicant: DÜRR SOMAC GmbH, Stollberg (DE)

(72) Inventors: Thomas Achatz, Niederdorf (DE); Eric Selbmann, Gersdorf (DE); Frank Wieland, Burkhardtsdorf (DE)

(73) Assignee: DÜRR SOMAC GmbH, Stollberg (DE)

( * ) Notice: Subject to any disclaimer, the term of this patent is extended or adjusted under 35 U.S.C. 154(b) by 0 days.

(21) Appl. No.: 15/300,144

(22) PCT Filed: Mar. 18, 2015

(86) PCT No.: PCT/DE2015/000139
§ 371 (c)(1),
(2) Date: Sep. 28, 2016

(87) PCT Pub. No.: WO2015/149739
PCT Pub. Date: Oct. 8, 2015

(65) Prior Publication Data
US 2017/0137279 A1 May 18, 2017

(30) Foreign Application Priority Data
Mar. 29, 2014 (DE) .................. 10 2014 004 828

(51) Int. Cl.
*B67D 7/42* (2010.01)
*B67D 7/00* (2010.01)
*F16K 1/12* (2006.01)

(52) U.S. Cl.
CPC ............... *B67D 7/42* (2013.01); *B67D 7/005* (2013.01); *F16K 1/123* (2013.01); *F16K 1/126* (2013.01)

(58) Field of Classification Search
CPC ........... B67D 7/42; B67D 7/005; F16K 1/126; F16K 1/123
See application file for complete search history.

(56) References Cited

U.S. PATENT DOCUMENTS

| | | | | |
|---|---|---|---|---|
| 4,195,673 A | * | 4/1980 | Johnston | B67D 7/42 141/349 |
| 4,991,821 A | * | 2/1991 | Beaston | F16L 37/113 251/144 |

(Continued)

FOREIGN PATENT DOCUMENTS

| | | |
|---|---|---|
| DE | 102006062716 A1 | 10/2007 |
| EP | 1235012 A2 | 8/2002 |
| GB | 1162996 A | 9/1969 |

OTHER PUBLICATIONS

International Search Report for PCT/DE2015/000139 (German and English), ISA/EP, Rijswijk, NL, dated Aug. 19, 2015.
(Continued)

*Primary Examiner* — Eric Keasel
(74) *Attorney, Agent, or Firm* — Harness, Dickey & Pierce, P.L.C.

(57) ABSTRACT

A filling adapter for a container to be filled with media, in particular for the filling of containers on assembly lines for the production of motor vehicles where the filling adapter is equipped with a hose packet, electrical, pneumatic, and hydraulic lines. A filling adapter according to the disclosure achieves better fluid flow properties while reducing the overall size, production costs, and weight of the filling adapter. The filling adapter is equipped with a coaxial valve in the region of the adapter head of the filling adapter, which coaxial valve, starting from the inlet cross section, is initially provided with a flow contour extending parallel to the longitudinal axis of the valve, which in the further flow course transitions into a flow contour extending at a right (Continued)

angle to the longitudinal axis of the valve to the outlet cross section.

5 Claims, 1 Drawing Sheet

(56) References Cited

U.S. PATENT DOCUMENTS 6,158,631 A * 12/2000 Varini ................. B05B 15/652
222/536
6,997,441 B2 * 2/2006 Yang ................. B65D 47/2031
251/284

OTHER PUBLICATIONS

Written Opinion of the ISA for PCT/DE2015/000139 (German), ISA/EP, Rijswijk, NL, dated Aug. 19, 2015.

* cited by examiner

FILLING ADAPTER HAVING A COAXIAL VALVE

CROSS-REFERENCE TO RELATED APPLICATIONS

This application is a 371 National Phase of PCT International Application PCT/DE2015/000139 filed on Mar. 18, 2015. This application claims the benefit of and priority to German Patent Application No. 10 2014 004 828.4, filed on Mar. 29, 2014. The entire disclosures of each of the above applications are incorporated herein by reference.

FIELD

The present disclosure relates to a filling adapter having a coaxial valve.

BACKGROUND

This section provides background information related to the present disclosure which is not necessarily prior art.

The disclosure relates to a filling adapter for a container to be filled with media (e.g. oils, gases, coolants and the like), in particular for the initial filling of containers with operating substances on assembly lines for the production of motor vehicles, wherein the filling adapter is equipped with a hose pack, electrical, pneumatic and hydraulic lines.

Containers must be filled with liquids or gases for numerous technical applications. A typical application in this respect are motor vehicles where housings, circuits, equalizing reservoirs and the like have to be filled with fuel, lubricants, coolants, and other operating substances. In the manufacturing process, these vehicles must be filled, for example, with brake fluid, power steering fluid, coolant, refrigerant, windshield wiper fluid, and fuel. These media are fed via hoses and special adapters to the respective circuits of the vehicles. The hoses typically include multiple lines with different functions for vacuum application, back suction, filling, aerating, as well as for electrical cables.

To perform the filling, a worker has to bring the adapter and hose pack to the vehicle depending on the respective position of the filling station and connect it to the ports of the circuits to be filled.

The filling adapters are equipped with valves to open or close media lines in the various process steps. Valves primarily used for this purpose include so-called gamma or pinch valves, seat valves, or coaxial valves. The coaxial valves mentioned last here are particularly well suited for use in filling adapters because they have the following advantageous properties compared to other valve designs:
  compact size, but a large cross section
  dirt resistant and long-lasting
  fast opening and closing times
  no pressure differential required
  resistant to back pressure and capable of both directions of flow
  the pressures to be switched have no influence on the valve, and the valve therefore cannot inadvertently be pushed open In the coaxial valves common in prior art, a piston presses the head tube onto the seat valve using compressed air when the valve is closed. As a result, the head tube is closed by said seat valve, and the medium is blocked. When the compressed air is switched to the other pressure chamber of the piston, the head tube is moved away from the seat valve, so that the flow is released.

Despite the functional advantages compared to other valve designs, some problems occur when using the coaxial valves known from prior art for filling adapters. For example, the media line must be rerouted several times around the seat valve to maintain the axial direction of flow. This is an unfavorable flow design. The required rerouting inevitable makes the valve bigger and the design more complex and costly.

SUMMARY

The purpose of this disclosure is to structurally alter a coaxial valve such that better flow properties are achieved if it is used in a filling adapter. At the same time, the overall size, production costs, and weight of the component are to be reduced.

This problem is solved in that the filling adapter is equipped with a coaxial valve in the region of its adapter head, which coaxial valve, starting from the inlet cross section, is initially provided with a flow contour extending parallel to the longitudinal axis of the valve, which in the further flow course transitions into a flow contour extending at a right angle to the longitudinal axis of the valve towards the outlet cross section.

A circular conical deflector plate is configured at the transitional section from the flow contour extending in parallel to the longitudinal axis of the valve to the flow contour extending at a right angle to the longitudinal axis of the valve. The conical tip of this deflector plate is oriented towards the central longitudinal axis of the flow contour extending parallel to the longitudinal axis of the valve. At the same time, this circular conical tip ends in the plane in which the central longitudinal axis of the flow contour extending at a right angle to the longitudinal axis of the valve is configured.

In this way, a rerouting of the media line by 90° is achieved with improved flow properties compared to prior art designs at the transitional section of the two flow contours that extend at a right angle to one another. This is in particular due to just one single rerouting of the respective medium in the coaxial valve, whereas four reroutings were necessary before.

Furthermore, the circular conical deflector plate causes an effective but still gentle rerouting of the flow. The elimination of multiple reroutings inevitably results in reduced size and weight of the entire assembly, which eventually reduces the weight of the adapter head as well. This improves the handling of the filling adapter for the worker. Finally, the production costs can be reduced due to the simpler design of the coaxial valve.

Further areas of applicability will become apparent from the description provided herein. The description and specific examples in this summary are intended for purposes of illustration only and are not intended to limit the scope of the present disclosure.

DRAWINGS

The figure shows an embodiment of the disclosure. Only the elements that are significant for the present disclosure are shown.

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
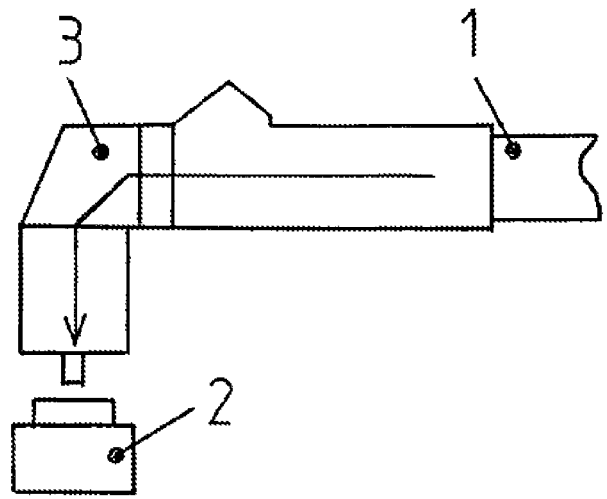
FIG. 1 shows a schematic representation of a filling adapter according to the present disclosure and including an associated hose pack and container to be filled.

FIG. 1 shows a stylized representation of the design of a filling adapter with an associated hose pack 1 and a vehicle container 2 to be filled, wherein a coaxial valve designed according to the disclosure is arranged in the adapter head 3. The flow pattern of the medium is shown as a line, and the direction of flow into the container to be filled is indicated by an arrow.

Figure 2:
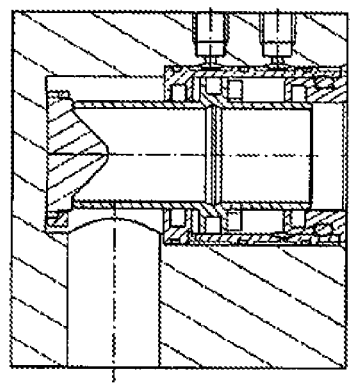
FIG. 2 shows a cross-sectional view of a coaxial valve according to the present disclosure in a valve-closed condition.

FIG. 2 shows a cross sectional view of the fundamental design of a coaxial valve according to the disclosure, here with the valve closed.

Figure 3:
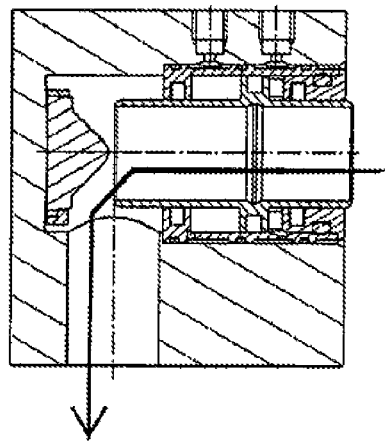
FIG. 3 shows a cross-sectional view of a coaxial valve according to the present disclosure in a valve-opened condition.

FIG. 3 shows a cross sectional view of the fundamental design of a coaxial valve according to the disclosure, here with the valve opened. The flow pattern of the medium is shown as a line, and the direction of flow into the container to be filled is indicated by an arrow.

Figure 4:
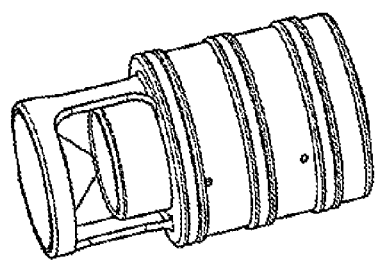
FIG. 4 shows a perspective view of a coaxial valve according to the present disclosure.

FIG. 4 shows a perspective view of the fundamental design of a coaxial valve according to the disclosure.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A filling adapter for the initial filling of vehicle containers with operating substances during vehicle manufacturing, wherein the filling adapter is equipped with a hose pack, wherein the filling adapter is equipped with a coaxial valve in the region of its adapter head, which coaxial valve, starting from the inlet cross section, is initially provided with a first flow contour extending parallel to a longitudinal axis of the valve, the adapter head having a body with a ninety degree bend such that the first flow contour transitions to a second flow contour that extends at a right angle to the longitudinal axis of the valve towards the outlet cross section, wherein a circular conical deflector plate is fixedly mounted to an inner wall of the adapter head at the transitional section from the first flow contour extending in parallel to the longitudinal axis of the valve to the second flow contour extending at a right angle to the longitudinal axis of the valve.

2. The filling adapter according to claim 1, wherein a circular conical tip of the circular conical deflector plate is oriented towards a central longitudinal axis of the first flow contour extending parallel to the longitudinal axis of the valve.

3. The filling adapter according to claim 1, wherein a circular conical tip of the circular conical deflector plate ends in the plane in which a central longitudinal axis of an outlet cross-section is positioned.

4. The filling adapter according to claim 1, wherein flow of the operating substance through the adapter head changes direction only once where the first flow contour transitions to the second flow contour.

5. A filling adapter for initially filling a vehicle container with an operating substance during vehicle manufacture, the filling adapter comprising:

an adapter head having a body, an inlet passageway that extends within the body of the adapter head along a first axis, and an outlet passageway that extends within the body of the adapter head along a second axis, and a transitional section where the first axis of the inlet passageway intersects the second axis of the outlet passageway;

the inlet passageway being arranged in fluid communication with the outlet passageway at the transitional section of the adapter head;

the inlet passageway being configured to be fluidly connected to a hose pack and transport the operating substance along a first flow contour that runs parallel to the first axis of the inlet passageway from the hose pack to the transitional section of the adapter head;

the outlet passageway being configured to transport the operating substance from the transitional section of the adapter head along a second flow contour that runs parallel to the second axis of the outlet passageway and discharge the operating substance into the vehicle container;

the body of the adapter head including a ninety degree bend at the transitional section such that the first axis of the inlet passageway is arranged at a right angle to the second axis of the outlet passageway at the transitional section;

a conical deflector fixedly mounted to an inner wall of the adapter head at the transitional section;

the conical deflector tapering to a conical tip that is oriented towards the inlet passageway and is aligned with the first axis of the inlet passageway such that flow of the operating substance through the adapter head changes direction only once where the conical deflector diverts the flow along the first flow contour to flow along the second flow contour.

* * * * *